United States Patent
Wendling

(10) Patent No.: US 11,116,177 B2
(45) Date of Patent: *Sep. 14, 2021

(54) CAT LITTER BOX MAT

(71) Applicant: Allan Wendling, New Lothrop, MI (US)

(72) Inventor: Allan Wendling, New Lothrop, MI (US)

(73) Assignee: Just Fur Love LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,452

(22) Filed: Mar. 2, 2021

(65) Prior Publication Data

US 2021/0176952 A1    Jun. 17, 2021

Related U.S. Application Data

(63) Continuation of application No. 17/070,297, filed on Oct. 14, 2020, now Pat. No. 10,966,406, which is a continuation of application No. 16/742,452, filed on Jan. 14, 2020, which is a continuation-in-part of application No. 16/246,901, filed on Jan. 14, 2019, which is a continuation of application No. 15/245,274, filed on Aug. 24, 2016, now Pat. No. 10,178,852.

(60) Provisional application No. 62/238,331, filed on Oct. 7, 2015.

(51) Int. Cl.
*A01K 1/015* (2006.01)
*A01K 1/01* (2006.01)

(52) U.S. Cl.
CPC .......... *A01K 1/0157* (2013.01); *A01K 1/0107* (2013.01)

(58) Field of Classification Search
CPC ..... A01K 1/0157; A01K 1/015; A01K 1/0107
See application file for complete search history.

(56) References Cited

U.S. PATENT DOCUMENTS

| | | |
|---|---|---|
| 1,773,141 A | 8/1930 | Ensley |
| 3,626,900 A | 12/1971 | Failla |
| 4,147,129 A | 4/1979 | Ruplen |
| 4,640,225 A | 2/1987 | Yananton |
| 4,800,841 A | 1/1989 | Yananton et al. |
| 5,053,124 A | 10/1991 | Liane |
| 5,080,046 A | 1/1992 | Cassone |
| 5,797,347 A | 8/1998 | Ochi |
| 5,819,688 A | 10/1998 | Walker |

(Continued)

OTHER PUBLICATIONS

Kindle Customer, First Amazon Review for Moonshuttle Blackhole Rectangular Cat Litter Mat, "A Requirement For the Cat Genie Automatic Litter Box!!" (https://www.amazon.com/gp/customer-reviews/R2EV3IGKKZC4IH/ref=cm_cr_arp_d_rvw_ttl?ie=UTF8&ASIN=B00G67FD6W), Mar. 3, 2015, 2 pages.

(Continued)

*Primary Examiner* — Monica L Barlow
(74) *Attorney, Agent, or Firm* — Wolf, Greenfield & Sacks, P.C.

(57) ABSTRACT

A cat litter box mat having a planar upper layer which overlaps and covers a planar lower layer. In some embodiments, the planar upper layer includes a pair of planar upper layers. The planar upper layers are connected to the planar lower layer. A plurality of openings are formed through the upper layers and these openings increase in area from a lower surface of each upper layer to an upper surface of the upper layers. Connecting members are provided for joining additional mats placed adjacent one another.

20 Claims, 3 Drawing Sheets

(56) References Cited

U.S. PATENT DOCUMENTS

| | | |
|---|---|---|
| 5,881,677 A | 3/1999 | Schmitt |
| 6,220,205 B1 | 4/2001 | Massie |
| 6,367,423 B1 | 4/2002 | Scheuer |
| 7,207,293 B2 | 4/2007 | Deming, Jr. |
| 8,033,249 B1 | 10/2011 | Cook et al. |
| 8,336,497 B2 | 12/2012 | van Zuilekom |
| D745,749 S | 12/2015 | Lee |
| 2001/0042518 A1 | 11/2001 | Ikegami et al. |
| 2003/0094140 A1 | 5/2003 | Otsuji et al. |
| 2009/0000557 A1 | 1/2009 | Takahashi et al. |
| 2010/0300367 A1 | 12/2010 | Askinasi |
| 2015/0164041 A1 | 6/2015 | Takahashi et al. |
| 2015/0296741 A1 | 10/2015 | Komuro et al. |
| 2016/0229324 A1 | 8/2016 | Lee |

OTHER PUBLICATIONS

Genevieve Burke, First Amazon Review, "This Blackhole Cat Litter Mat is awesome. All of the left over cat litter from our cats coming out of their cat box stays on the mat and then dumping the cat litter out is fast and easy!", Dec. 4, 2013, 4 pages.

Daehee Lee, YouTube video Blackhole Cat Litter Mat Litter Box Mat Innovative Dual Structure, (https://www.youtube.com/watch?v=-JhbvuyAqP0), 13 pages, Nov. 5, 2013.

Moonshuttle Blackhole Cat Littler Mats, (https://www.floppycats.com), Jul. 5, 2014, 16 pages.

BlackHole Litter Mat Really Traps Cat Litter! (https://www.hauspanther.com/2014/08/19/blackhole-litter-mat-really-traps-cat-litter/). Aug. 19, 2014, 12 pages.

CAT LITTER BOX MAT

CROSS-REFERENCE TO RELATED APPLICATIONS

This application is a continuation application of U.S. patent application Ser. No. 17/070,297 filed Oct. 14, 2020, which is a continuation application of U.S. patent application Ser. No. 16/742,452 filed Jan. 14, 2020, which is a continuation-in-part application of U.S. patent application Ser. No. 16/246,901 filed Jan. 14, 2019, which is a continuation application of U.S. Pat. No. 10,178,852 issued Jan. 15, 2019, which claims priority to U.S. Provisional Patent Application 62/238,331 filed Oct. 7, 2015, the contents of which are each incorporated herein by reference.

TECHNICAL FIELD

The present invention relates to a cat litter box.

BACKGROUND

Many people in the United States and elsewhere own one or more cats as pets. Many cats, furthermore, are house pets and spend most if not all of their time within the house.

In order to keep cats within the house, however, it is necessary to establish a litter box and train the cats to use the litter box for their lavatory functions. These cat litter boxes are typically filled with cat litter, such as wood or paper chips, which are water absorbent.

Ideally, all of the cat litter together with all of the material left by the cat remains within the litter box. After a period of time, the litter in the litter box is typically cleaned and replaced with fresh litter.

However, even though ideally all of the cat litter remains within the litter box, in practice some litter oftentimes adheres to the paws of the cat. Consequently, when the cat leaves the litter box, litter which adheres to the paws of the cat travels with the cat when the cat leaves the litter box. This litter eventually falls off within the home outside the litter box which creates not only an unsightly, but also unsanitary, mess.

In order to contain the cat litter near the cat litter box, there have been previously known cat litter pads which are placed adjacent the litter box so that cats using the litter box must walk across the litter pad. The litter pad typically contains a plurality of openings arranged in an array so that cat litter that adheres to the paws of the cat will drop through the openings for easy collection under the cat litter pad.

These previously known cat litter pads, however, have not proven wholly successful in use. One disadvantage of the previously known cat litter pads is that the cat litter pad must be constructed so that the grid which supports the cat as the cat walks across the pad must be of sufficient size not only to support the cat, but also to provide long life for the cat pad. As such, the wall thickness for the grid must be sufficiently large which, in turn, reduces the size of the openings formed by the grid walls. The reduction in the opening size reduces the overall amount of area on the cat litter pad to receive and channel cat litter through the pad and to an underlying collection area. This, in turn, reduces the efficiency of removing the litter from the cat's paws.

Simply reducing the wall thickness for the grid, and thus increasing the size of the openings formed by the grid, results in an overall construction for the grid forming the cat litter pad that is flimsy and subject to rapid wear and tear. Such a flimsy cat litter pad exhibits a useful life that is unacceptable.

A still further disadvantage of the previously known cat litter pads is that the previously known cat litter pads are subject to urine from the cat. Such cat litter pads are often made from an elastomeric material which soaks up the urine from the cat. This, in turn, results in an undesirable odor from the cat litter pad. When the level of the odor becomes unacceptable, it is necessary to replace the cat litter pad with a new one.

SUMMARY

The present invention provides a cat litter mat which overcomes the above-mentioned disadvantages of the previously known litter mats.

In an embodiment, a litter mat includes at least one planar upper layers and a planar lower layer constructed of a synthetic material. In some embodiments, the litter mat includes a pair of planar upper layers. Each upper layer has an upper surface and an opposite lower surface. The planar lower layer has an upper surface and an opposite lower surface. The planar upper layers are connected to opposite sides of the planar lower layer forming a gap between adjacent ends of each of the planar upper layers. A pair of mouths are at opposite ends of the planar upper layers between the planar upper layers and the lower layer. A plurality of spaced openings extend entirely through said planar upper layers with the openings increasing in cross-sectional area from the upper surfaces of the planar upper layers to the lower surfaces of said planar upper layers.

By tapering the openings, the upper layers of the mat effectively increase the overall area of the openings, thus maximizing the amount of litter which is removed by the cat's paws as the cat walks across the mat. However, since the bottom of the openings in the upper layers is thicker, the overall cat litter mat enjoys a durability that equals or exceeds the previously known litter mats. Furthermore, the size of the opening at the lower side of the upper layers of the litter mat is still sufficiently large to allow cat litter to freely pass through the mat and to the lower layer.

The lower layer of the cat litter mat has a continuous upper surface to receive and support cat litter that falls through the upper grid layer and to the lower layer. The lower layer, furthermore, may be covered by additional protection. In use, the cat walks across the litter mat as the cat exits from the cat litter box. Any cat litter that adheres to the paws of the cat simply travels through the upper grid and to the lower layer. After a period of time, the cat litter mat may be easily cleaned by separating the upper layers from the lower layer and placing the collected litter on the lower layer into the appropriate trash receptacle.

In addition, the entire cat litter mat is covered with a water repellant. The water repellant thus repels urine and enables quick and complete cleaning of the cat litter mat.

BRIEF DESCRIPTION OF THE DRAWINGS

A better understanding of the present invention will be had upon reference to the following detailed description when read in conjunction with the accompany drawing, wherein like reference characters refer to like parts throughout the several views, and in which.

DETAILED DESCRIPTION

Figure 1:
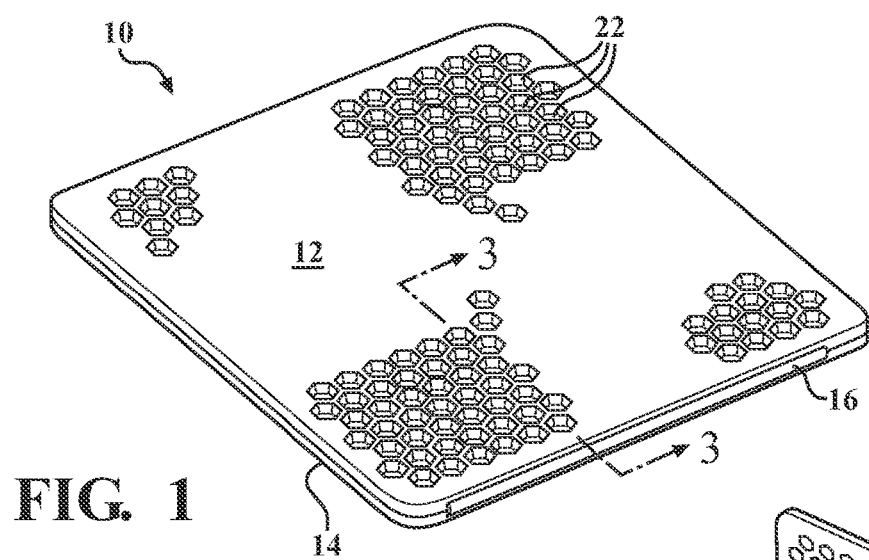
FIG. 1 is a perspective view illustrating an embodiment of a cat litter mat in an operational position.

With reference first to FIG. 1, a preferred embodiment of a cat litter mat 10 is shown. The cat litter mat 10 includes a planar upper layer 12 and a planar lower layer 14. Both of the layers 12 and 14 are generally planar and rectangular in shape and are made of a synthetic, waterproof material such as plastic, nylon, and the like.

Figure 2:
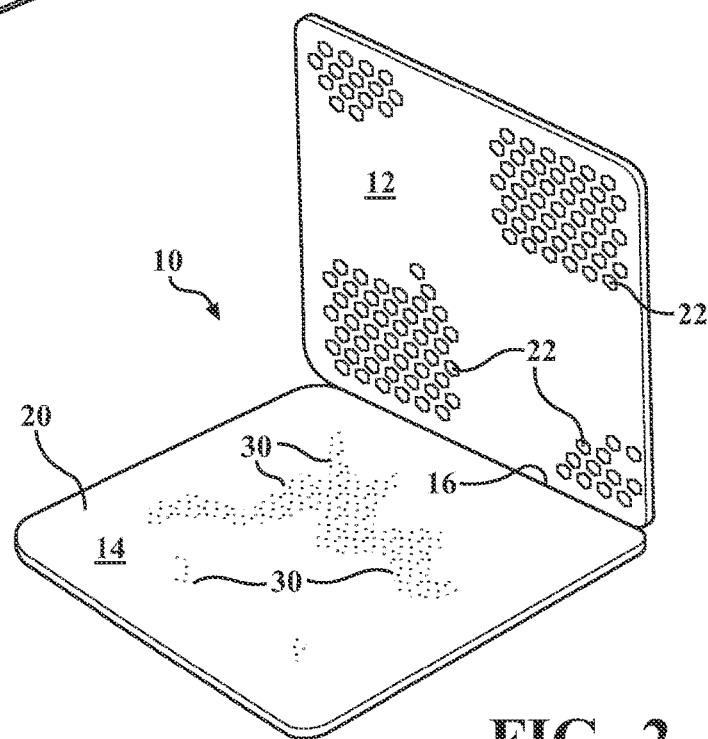
FIG. 2 is a view similar to FIG. 1, but illustrating the cat litter mat in a cleaning position.

As best shown in FIG. 2, the upper layer 12 and lower layer 14 are pivotally connected together along one edge by a hinge 16. Thus, the upper layer 12 is movable between an in use position, illustrated in FIG. 1 in which the upper layer 12 flatly abuts against and overlies the lower layer 14, and a cleaning position, illustrated in FIG. 2 in which the upper layer 12 is pivoted away from the lower layer 14 thus exposing an upper surface 20 of the lower layer 14.

Figure 3:
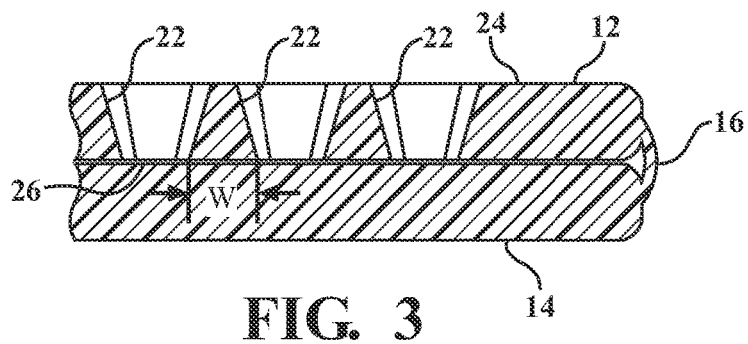
FIG. 3 is a cross-sectional view taken along line 3-3 in FIG. 1.

With reference now to FIGS. 1 and 3, a plurality of openings 22 are formed between an upper surface 24 and a lower surface 26 of the upper layer 12. These openings 22, furthermore, are generally hexagonal in shape and are arranged in a grid pattern so that the width of the sidewall forming the openings 22 remains substantially constant throughout the grid.

As best shown in FIG. 3, the openings 22 taper inwardly from the upper surface 24 and to the lower surface 26 of the upper layer 12. Thus, the size of the openings 22 at the upper surface 24 of the upper layer 12 is much larger than the total area of the openings 22 at the lower surface 26 of the upper layer 12. However, the size of the openings 22 at the lower surface 26 of the upper layer 12 is still sufficiently large to allow cat litter to pass freely through the openings 22. In embodiments, the openings 22 may taper inwardly from the lower surface 24 to the upper surface 26 of the upper layer 12.

With reference now to FIG. 2, the lower layer 14 has a continuous flat upper surface 20. This upper surface 20 is constructed of a water repellant material. In use, furthermore, an additional waterproof layer may be placed in between the upper layer 12 and lower layer 14 of the cat litter mat 10.

In use, the upper layer 12 is moved to the position shown in FIG. 1 in which the upper layer 12 overlies the lower layer 14 of the litter mat 10. The mat 10 is then positioned adjacent the cat litter box (not shown) so that the cat exiting from the cat litter box will pass across the mat 10.

During use, as the cat passes across the cat litter mat 10, cat litter which adheres to the paws of the cat will drop off the paws and fall through the openings 22 in the upper layer 12 of the cat litter mat 10.

With reference now to FIG. 2, after prolonged use, the upper layer 12 is pivoted to its open position thus exposing the upper surface 28 of the lower layer 14. After prolonged use, cat litter 30 will have accumulated on the upper surface 28 of the lower layer 14. This cat litter 30, however, may be easily disposed of by simply dumping the cat litter 30 in the appropriate trash receptacle.

Due to the tapered shape of the openings 22, the relatively wide area of opening provided in the upper surface 28 of the litter mat 10 ensures that essentially all of the cat litter that adheres to the cat's paws will be removed by the mat 10 and drop through the openings 22 to the lower layer 14 of the cat litter mat 10. However, the increased width W (FIG. 3) of the grid walls at the lower surface 26 of the upper layer 12 provides sufficient durability and long life of use for the litter mat 10.

Preferably, both the upper layer 12 and lower layer 14 of the litter mat are constructed of an elastomeric material. Once constructed, both layers 12 and 14 are treated with a water repellant substance which prevents the urine from the cat from soaking into the cat litter mat 10. The water repellant material also provides for easy cleaning of the cat litter mat 10 when desired.

Figure 4:
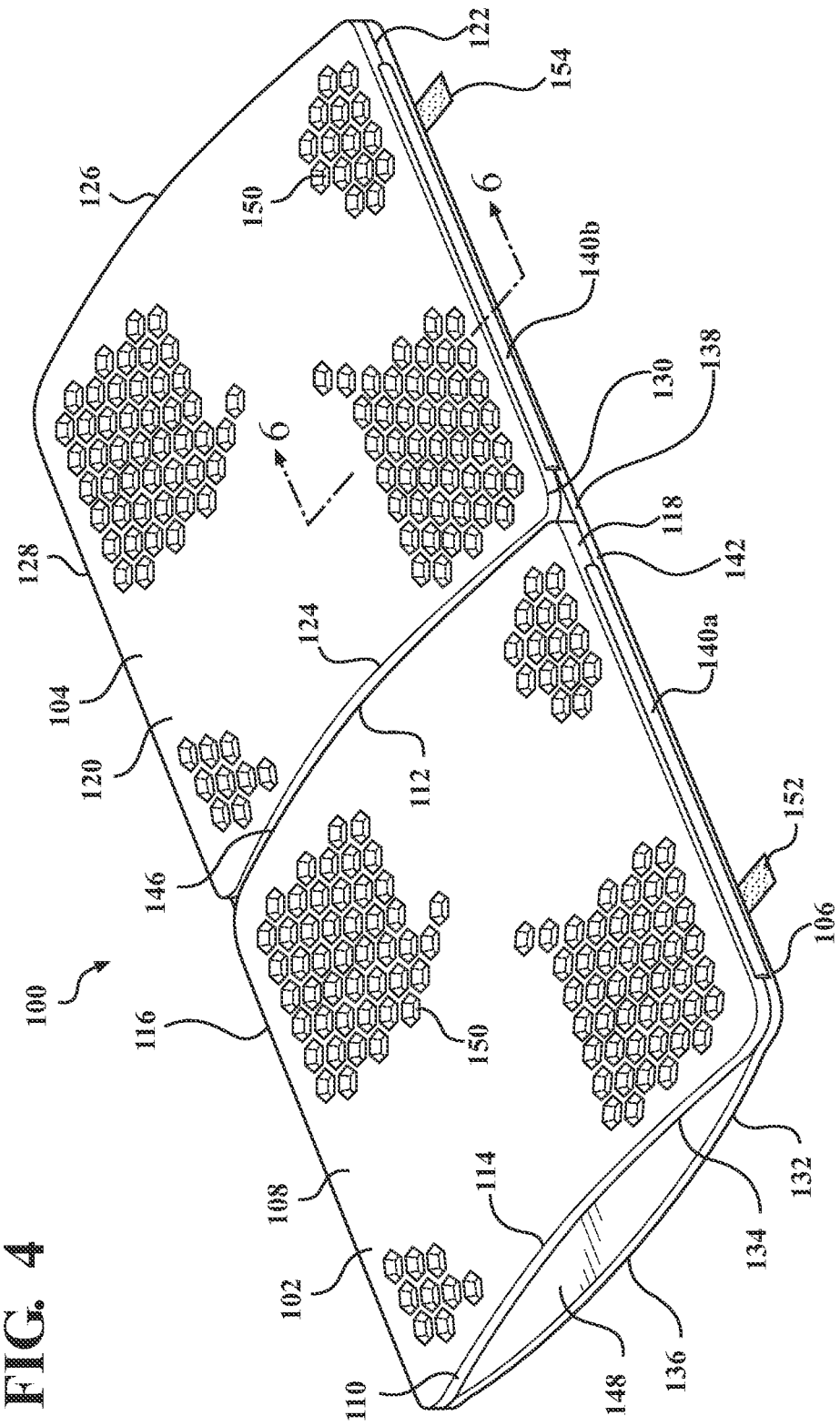
FIG. 4 is a perspective view illustrating another embodiment of a cat litter mat in an operational position.

Referring now to FIG. 4, another embodiment of a cat litter mat 100 is shown. The mat 100 includes at least one upper layer. In some embodiments, the upper layer includes a first upper layer 102 and a second upper layer 104. The mat 100 also includes a lower layer 106. Preferably, both the first and second upper layers 102, 104 and the lower layer 106 of the litter mat 100 are constructed of an elastomeric material. Once constructed, at least the upper layers 102, 104 are treated with a water repellant substance which prevents the urine from the cat from soaking into the cat litter mat 100. The water repellant material also provides for easy cleaning of the cat litter mat 100 when desired. In some embodiments, an additional waterproof layer (not shown) is placed in between the upper layers 102, 104 and the lower layer 106 of the cat litter mat 100. Each of the layers 102, 104, 106 are generally planar and are made of a synthetic, waterproof material such as plastic, nylon, and the like.

The first upper layer 102 has an upper surface 108, a lower surface 110, a first end 112, a second end 114, and a pair of sides 116, 118. Similarly, the second upper layer 104 has an upper surface 120, a lower surface 122, a first end 124, a second end 126, and a pair of sides 128, 130. The lower layer 106 has a lower surface 132, an upper surface 134, a first end 136, a second end 138, and a pair of sides 140, 142.

The first and second upper layers 102, 104 are arranged such that the first ends 112, 124 thereof abut, or at least brought into close proximity of one another, and the lower surfaces 110, 122 thereof overlay the upper surface 134 of the lower layer 106. The first and second upper layers 102, 104 are connected to the lower layer 106 at opposite sides thereof. Specifically, the first and second sides 116, 118 of the first upper layer 102 are connected to first and second sides 140, 142 of the lower layer 106, respectively, and the first and second sides 128, 130 of the second upper layer 104 are also connected to the first and second sides 140, 142 of the lower layer 106, respectively.

Figure 5:
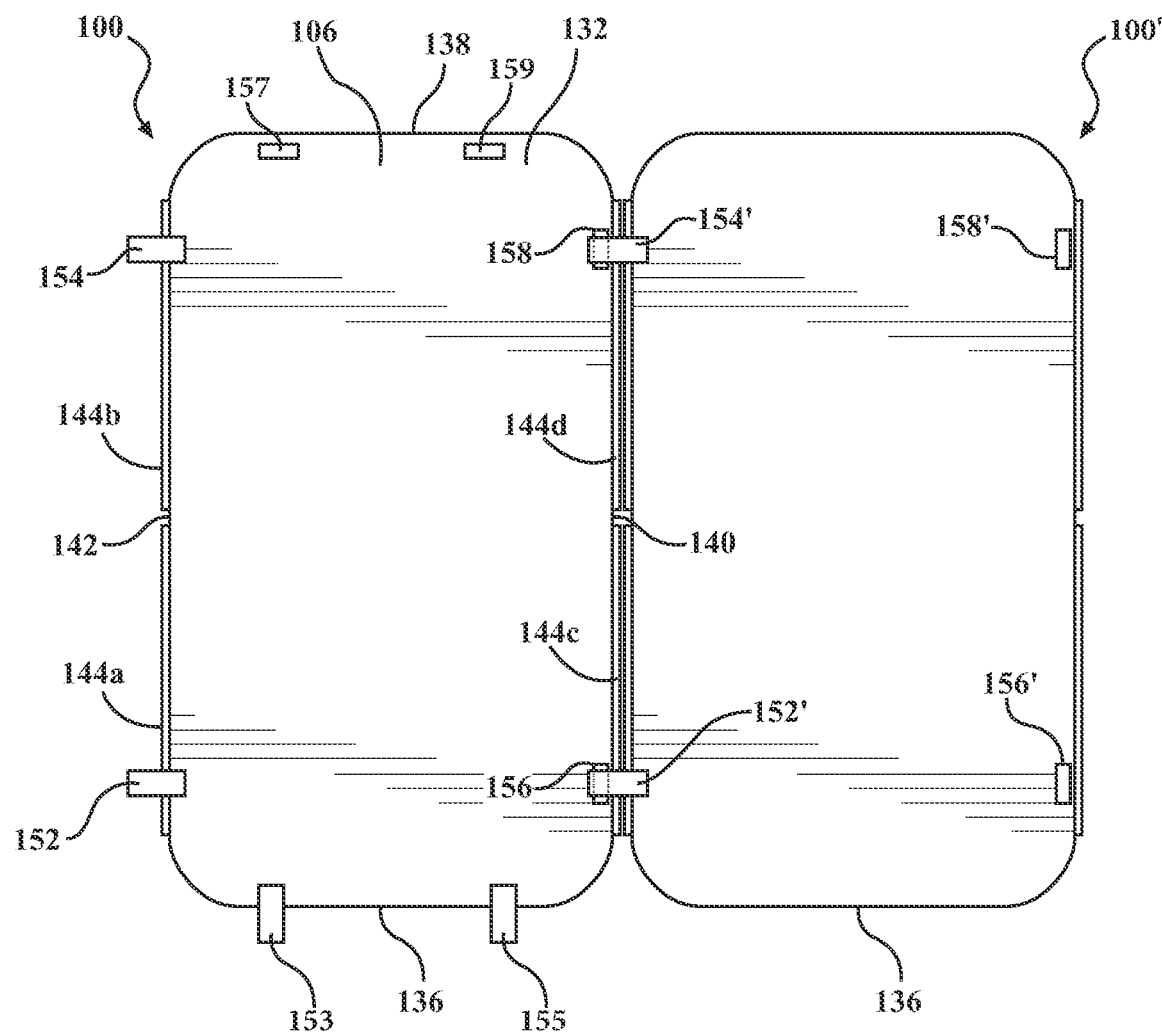
FIG. 5 is a bottom view of the cat litter mat shown in FIG. 4 and attached to a second cat litter mat.

The first and second upper layers 102, 104 may be connected to the sides 140, 142 of the lower layer 106 in any suitable manner, such as by sewing, fabric welding, using an adhesive, hook and loop fasteners, hinges, and the like. As shown in FIGS. 4 and 5, a plurality of hinges 144a, 144b, 144c, 144d, are provided to join the sides of the first and second upper layers 102, 104 to the lower layer 106 at opposite sides 140, 142 thereof. More particularly, four hinges 144a, 144b, 144c, 144d are provided in order to join the first and second upper layers 102, 104 to the sides 140, 142 of the lower layer 106. It should be appreciated that the upper layer 102, the lower layer 104, and the hinges 144a, 144b, 144c, 144d may be a one-piece construction formed from a single material.

As such, a gap 146 is provided between the first ends 114, 124 of the first and second upper layers 102, 104. Access to the lower layer 106 of the mat 100 is provided through the gap 146 when the first and second upper layers 102, 104 are rotated away from one another and the lower layer 106 is bent at the gap 146. A pair of mouths are also formed at opposite second ends 114, 126 of the first and second upper layers 102, 104 between the upper layers 102, 104 and the lower layer 106. Only one mouth 148 is shown at the second end 114 of the first upper layer 102. However, it is to be understood that an identical mouth is also formed at the second end 126 of the second upper layer 104.

Figure 6:
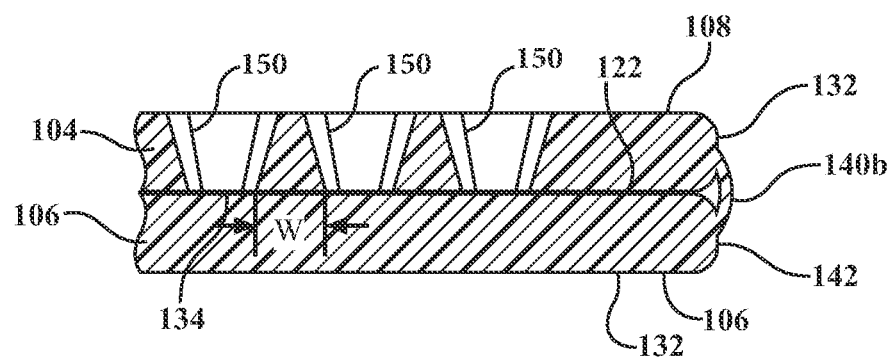
FIG. 6 is a cross-sectional view taken along line 6-6 in FIG. 4.

With reference now to FIGS. 4 and 6, a plurality of openings 150 is formed between the upper surfaces 108, 120 and the lower surfaces 110, 122 of the first and second upper layers 102, 104. These openings 150, furthermore, are generally hexagonal in shape and are arranged in a grid pattern so that the width of the sidewall forming the openings 150 remains substantially constant throughout the grid.

As shown in FIG. 6, the openings 150 taper inwardly from the upper surface 108 to the lower surfaces 122 of the second upper layer 104. Thus, the size of the openings 150 at the upper surface 108 of the second upper layer 104 is much larger than the total area of the openings 150 at the lower surface 122 of the second upper layer 104. However, the size of the openings 150 at the lower surfaces 122 of the second upper layer 104 is still sufficiently large to allow cat litter to pass freely through the openings 150. In some embodiments, the openings 150 formed in the first upper layer 102 are identical to those openings 150 formed in the second upper layer 104. In embodiments, the openings 150 may taper inwardly from the lower surface 122 to the upper surface 108 of the second upper layer 104.

The mat 100 also includes connecting members, such as hooks, clasps, buttons, hook and loop fasteners, and the like, for attaching additional mats to one another to provide a larger litter collecting surface. In an embodiment, as shown in FIGS. 4 and 5, a pair of first connecting members 152, 154 are provided on or proximate the second side 142 of the lower layer 106 and a pair of second connecting members 156, 158 are provided on or proximate the first side 140 of the lower layer 106. However, it is to be understood that only a single first connecting member 152 and a single second connecting member 156 may be provided. The first and second connecting members 152, 154, 156, 158 may extend from either the lower layer 106 itself or, alternatively, from the upper layers 102, 104. In some embodiments, the connecting members 152, 154, 156, 158 are hook and loop fasteners, such as Velcro, and provided on the lower surface 132 of the lower layer 104.

As shown in FIG. 5, in some embodiments, the mat 100 also includes at least one third connecting member 153 extending from the first end 136 of the lower layer 106 and at least one fourth connecting member 157 extending from the second end 138 of the lower layer 106. As shown in FIG. 5, a pair of third connecting members 153, 155 and a pair of fourth connecting members 157, 159 are provided. The third connecting members 153, 155 may be similar to the first connecting members 152, 154 and the fourth connecting members 157, 159 may be similar to the second connecting members 156, 158, or vice versa. As with the first connecting members 152, 154 and the second connecting members 156, 158, the third connecting members 153, 154 and the fourth connecting members 157, 159 may also extend from the second end 114 of the first upper layer 102 and the second end 126 of the second upper layer 104, respectively.

As shown in FIG. 5, a second mat 100' may be provided in a side-by-side manner with respect to the mat 100 to form a larger litter collecting surface. The second mat 100' is similar in structure to the mat 100. As such, the second mat 100' includes a pair of first connecting members 152', 154' and a pair of second connecting members 156', 158'. It is to be understood that the first connecting members 152, 154 of the mat 100 are configured to mate with the second connecting members 156', 158' of the second mat 100' and the second connecting members 156, 158 of the first mat 100 are configured to mate with the first connecting members 152', 154' of the second mat 100'.

In use, the first and second upper layers 102, 104 lie flat against the lower layer 106 of the mat 100 such that the lower surfaces 110, 122 of the first and second upper layers 102, 104 overly the upper surface 134 of the lower layer 106, as shown in FIGS. 1 and 4. The mat 100 is then positioned adjacent a cat litter box (not shown) so that a cat exiting from the cat litter box will walk across the mat 100.

During use, as the cat passes across the cat litter mat 100, cat litter which adheres to the paws of the cat will drop off the paws and fall through the openings 150 in the upper layers 102, 104 of the cat litter mat 100. Due to the tapered shape of the openings 150, the relatively wide area of the openings 150 provided in the upper surfaces 108, 120 of the litter mat 100 ensures that essentially all of the cat litter that adheres to the cat's paws will be removed by the mat 100 and drop through the openings 150 to the lower layer 106 of the cat litter mat 100. However, the increased width W, as shown in FIG. 6, of the grid walls at the lower surface 122 of the second upper layer 104, as well as the first upper layer 102, provides sufficient durability and long life of use for the litter mat 100.

After prolonged use, cat litter will have accumulated on the upper surface 134 of the lower layer 106. This cat litter, however, may be easily disposed of by simply dumping the cat litter in an appropriate trash receptacle. In doing so, the litter within the mat 100 may be removed by compressing the sides of the mat 100 between the upper layers 102, 104 and the lower layer 106. This increases the distance between the first and second upper layers 102, 104 and, thus, the size of the mouths 148 as well as the gap 146 between the upper layers 102, 104. Thereafter, the mat 100 can be tilted over the trash receptacle to remove the litter from the mat 100.

Having described my invention, however, many modifications thereto will become apparent to those skilled in the art to which it pertains without deviation from the spirit of the invention as defined by the scope of the appended claims.

The invention claimed is:

1. A litter mat comprising:
   a planar upper layer constructed of a synthetic material and having an upper surface, an opposite lower surface, opposing side edges, and opposing ends;
   a planar lower layer constructed of a synthetic material, and having an upper surface, an opposite lower surface, opposing side edges, and opposing ends, the upper surface of the planar lower layer being treated with a water repellant;
   said planar upper layer positionable over said planar lower layer so that said side edges and said ends of said planar upper layer are substantially aligned with said side edges and said ends of said planar lower layer, one or more side edges of said planar upper layer being connected to one or more corresponding side edges of said planar lower layer; and a plurality of spaced openings extending entirely through said planar upper layer.

2. The litter mat of claim 1, wherein said water repellant forms a coating on said upper surface of said planar lower layer.

3. The litter mat of claim 1, wherein said planar lower layer is formed of a first material and said water repellant is formed from a second material different from said first material.

4. The litter mat of claim 3, wherein said first material is selected from one of an elastomeric material, plastic, and nylon.

5. The litter mat of claim 3, wherein said second material is selected from one of plastic and nylon.

6. The litter mat of claim 1, wherein said plurality of spaced openings increase in cross sectional area from said lower surface of said planar upper layer to said upper surface of said planar upper layer.

7. The litter mat of claim 1, wherein each of said side edges of said planar upper layer are connected to corresponding side edges of said planar lower layer.

8. The litter mat of claim 7 including a hinge pivotally connecting said side edges of said planar upper layer to said side edges of said planar lower layer.

9. The litter mat of claim 1, wherein said planar upper layer includes a pair of planar upper layers, a gap formed between adjacent ends of said pair of planar upper layers.

10. A litter mat comprising:
a planar lower layer constructed of a synthetic material;
a planar upper layer constructed of a synthetic material and overlying said planar lower layer, said planar upper layer pivotally connected to said planar lower layer; and
a plurality of spaced openings extending entirely through said planar upper layer, said openings increasing in cross sectional area from a side of said planar lower layer in abutment with said planar upper layer and away from said planar lower layer,
wherein said planar lower layer has an upper surface facing said planar upper layer, said upper surface of said planar lower layer is treated with a water repellant.

11. The litter mat of claim 10, wherein said water repellant forms a waterproof coating on said upper surface of said planar lower layer.

12. The litter mat of claim 10, wherein said planar lower layer is formed of a first material and said water repellant is formed from a second material different from said first material.

13. The litter mat of claim 12, wherein said first material is selected from one of an elastomeric material, plastic and nylon.

14. The litter mat of claim 12, wherein said second material is selected from one of plastic and nylon.

15. The litter mat of claim 10, wherein side edges of said planar lower layer are connected to corresponding side edges of said planar upper layer.

16. The litter mat of claim 15 including a hinge pivotally connecting said side edges of said planar lower layer to said side edges of said planar upper layer.

17. The litter mat of claim 10, wherein said planar upper layer includes a pair of planar upper layers, a gap formed between adjacent ends of said pair of planar upper layers.

18. A litter mat comprising:
a planar upper layer constructed of a synthetic material and having an upper surface, an opposite lower surface, opposing side edges, and opposing ends;
a planar lower layer constructed of a synthetic material, and having an upper surface, an opposite lower surface, opposing side edges, and opposing ends;
said planar upper layer overlying said planar lower layer so that said side edges and said ends of said planar upper layer are substantially aligned with said side edges and said ends of said planar lower layer, said side edges of said planar upper layer being connected to corresponding side edges of said planar lower layer;
a waterproof layer provided between said planar upper layer and said planar lower layer;
at least one connecting member permanently affixed to said planar lower layer extending outward beyond at least one of said side edges of said planar lower layer; and
a plurality of spaced openings extending entirely through said planar upper layer.

19. The litter mat of claim 18, wherein said planar lower layer is formed of a first material and said waterproof layer is formed from a second material different from said first material.

20. The litter mat of claim 18, further comprising:
a pair of connecting members on said planar lower layer extending outward beyond at least one of said side edges of said planar lower layer.

* * * * *